Oct. 16, 1956  R. K. SHEWMON  2,766,573
MOWER WITH AIR-COOLED ELECTRIC MOTOR AND CUTTING DISC
Filed Jan. 4, 1954  2 Sheets-Sheet 1

INVENTOR.
RALPH K. SHEWMON
BY
ATTORNEY

Oct. 16, 1956    R. K. SHEWMON    2,766,573
MOWER WITH AIR-COOLED ELECTRIC MOTOR AND CUTTING DISC
Filed Jan. 4, 1954    2 Sheets-Sheet 2

INVENTOR.
RALPH K. SHEWMON
BY
John T. Maurin
ATTORNEY

United States Patent Office 2,766,573
Patented Oct. 16, 1956

2,766,573

MOWER WITH AIR-COOLED ELECTRIC MOTOR AND CUTTING DISC

Ralph K. Shewmon, Dayton, Ohio, assignor to General Motors Corporation, Detroit, Mich., a corporation of Delaware Application January 4, 1954, Serial No. 401,958

8 Claims. (Cl. 56—25.4)

This invention relates to mowing machines, and particularly to mowing machines of the type having a power device, such as an electric motor mounted on one side of the platform and driving a horizontally rotating blade positioned on the opposite side of the platform.

In lawn mowing machines of the type having a horizontally rotating cutting blade, and particularly those machines operated by electric motors, considerable difficulty has been experienced in having the air circulation for the electric motor clogged because of entry of mowed materials into the interior of the electric motor.

It is conventional in those lawn mowing machines driven by electric motors to have a fan placed internally of the electric motor for circulating air through the motor from end to end thereof. Normally, the end frames of the electric motor are provided with suitable openings that provide for the circulation of air through the motor as forcefully produced by the fan carried on the drive shaft of the motor internally of the casing.

In structures of this type the electric motor is mounted with one end supported directly on a platform so that the drive shaft of the electric motor will extend through the platform and carry a horizontally rotated blade for direct driving thereof.

In structures such as these, the rubbish and debris created by the mowing blade is forcefully thrown against the underside of the platform supporting the electric motor with the result that the debris enters the openings in the end frame of the electric motor through which the air circulates through the motor. Ultimately, sufficient debris is thrown internally of the motor as to cause the same to malfunction and ultimately stop.

It is therefore an object of this invention to provide a mowing machine of the type aforesaid wherein deflectors or louvers are provided at each of the openings in the electric motor at the platform level so that the debris and mowed material engaging the underside of the platform supporting the motor will be deflected from the air circulating openings and thus prevent entry into the same.

Further objects and advantages of the present invention will be apparent from the following description, reference being had to the accompanying drawings wherein a preferred form of the invention is clearly shown.

Figure 1:
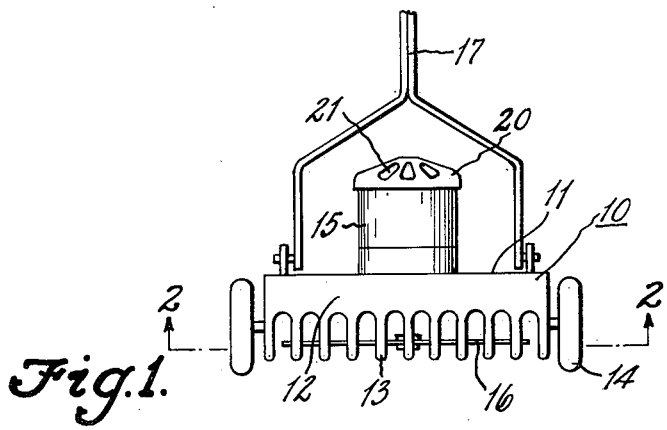
Figure 1 is a perspective elevational view of a mowing machine incorporating features of this invention.

In this invention the mowing machine includes a mounting platform 10 having a horizontal wall 11 and a forward wall 12 provided with the guard teeth 13. The platform 10 is supported by the wheels 14.

On the upper side of the platform wall 11 there is mounted a power device in the form of an electric motor 15 secured thereon by bolts 52. The drive shaft 18 of the electric motor 15 extends through the horizontal wall 11 of the platform 10 and has a mowing blade 16 secured on the end thereof through means of a hub 53 having the set-screw 54 engaging the shaft 18.

A handle 17 is attached to the platform 10 for moving the mowing machine.

As illustrated in Figures 1 through 4, the electric motor 15 has an end frame 20 that is provided with a plurality of openings 21 through which air can enter the motor. Internally of the motor 15, and carried on the drive shaft 18 thereof there is provided a fan 22 that forcefully circulates air through the interior of the motor through the openings 21 and through openings 25 provided in the opposite end frame 26 of the electric motor.

The end frame 26 of the electric motor 15 has each of the openings 25 positioned radially about the oil reservoir chamber 27 conventionally provided in the end frame 26. The openings 25 are provided in the bottom wall 28 of the end frame 26.

Integral with the end wall 28 and cast as a part thereof, there is provided the louvers or deflector plates 30 adjacent each of the openings 25. The louvers or deflector plates 30 substantially cover the area of the openings 25 and have a side wall 31 that cooperates with the bottom wall 32 of the louver to form a channel 50 on the exterior side 51 of the bottom wall 28 of the end frame 26.

The fan 22 within the motor 15 draws air through the openings 21 in the end frame 20 and causes the air to discharge through the openings 25 in the bottom wall 28 of the end frame 26 after circulation through the motor.

Figure 2:
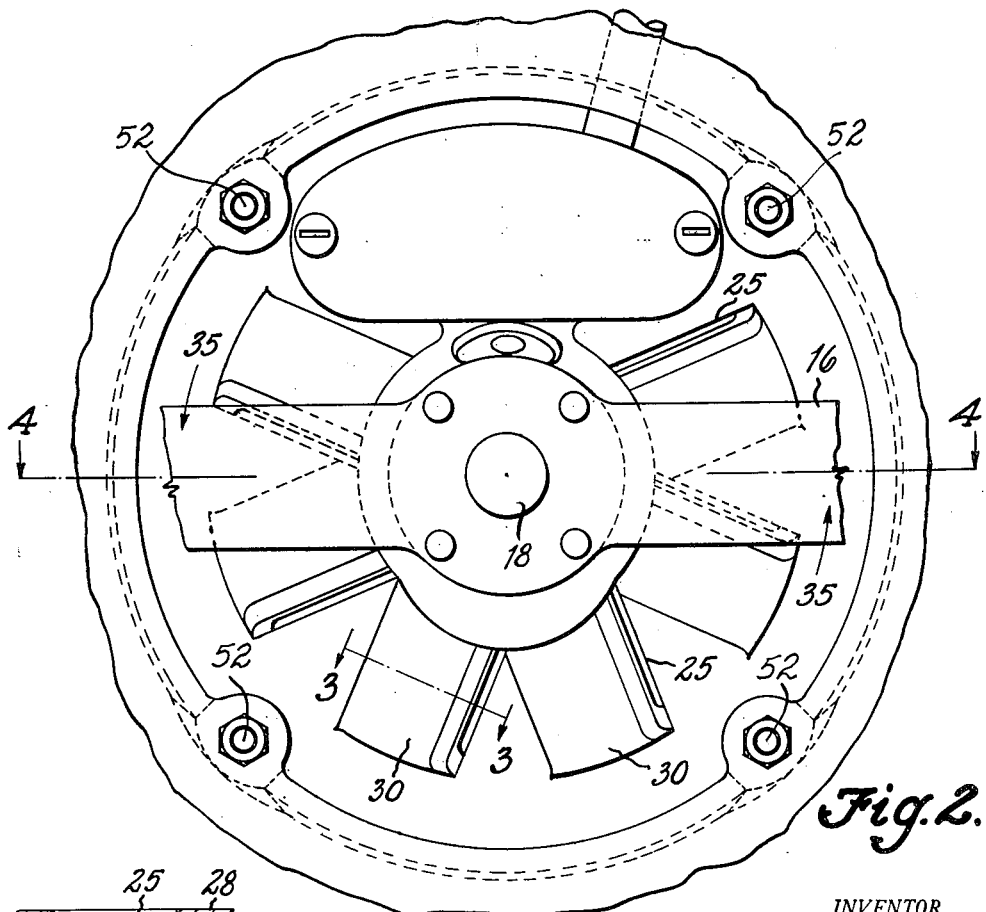
Figure 2 is an enlarged fragmentary bottom view of the mowing machine taken substantially along line 2—2 of Figure 1.
Figure 3:
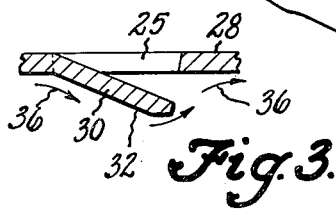
Figure 3 is a cross sectional view taken along line 3—3 of Figure 2 illustrating one of the louvers or deflecting plates.

Each of the louvers or deflector plates 30 are positioned angular to the bottom wall 28 of the end frame of the motor, as shown in Fig. 3, and are angularly positioned in the direction of rotation of the blade 16 so that movement of mowed material and debris between the blade 16 and the underside of the platform 10 will be in the general direction of the rotation of the blade 16, as illustrated by the arrows 35 of Figure 2. With the deflector plates 32 being angled in the direction of rotation of the blade 16, the air and debris will travel over the deflector plates 32 substantially according to the flow indicated by the arrows 36 in Figure 3. Thus, none of the debris can enter the opening 25 through which air is discharging from the interior of the electric motor 15.

Figure 4:
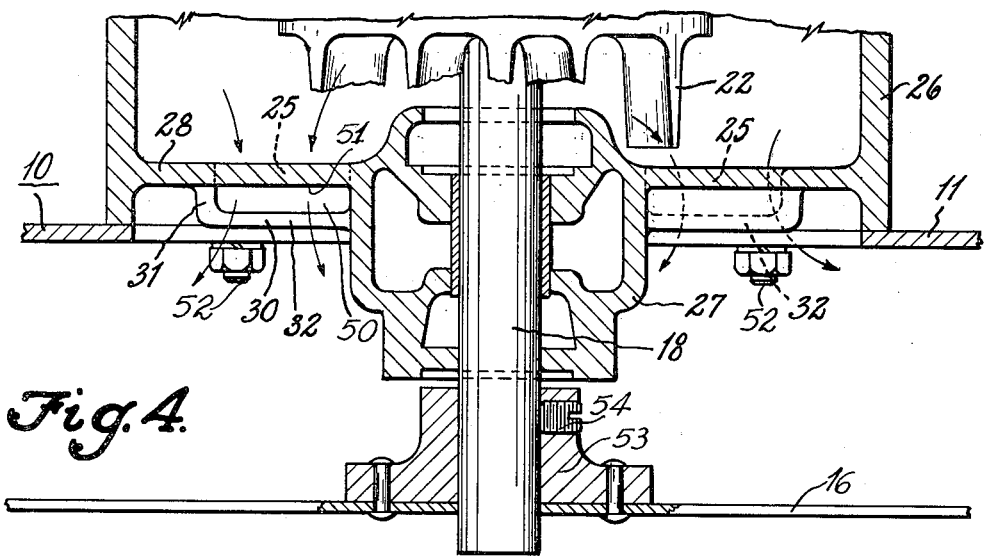
Figure 4 is a cross sectional view taken substantially along line 4—4 of Figure 2.
Figure 5:
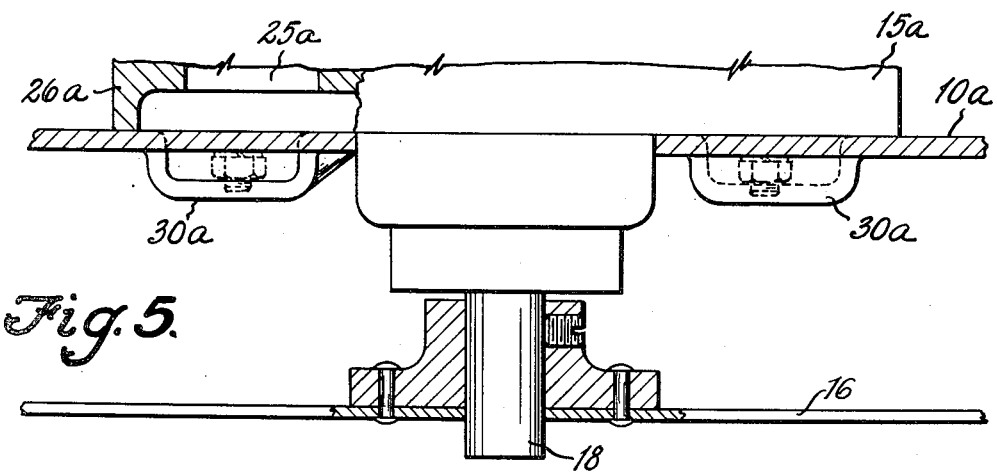
Figure 5 is a cross sectional view similar to Figure 4 but illustrating the louvers or deflecting plates positioned in the platform of the machine rather than in the end frame of the electric motor as illustrated in Figure 4.

In Figure 5 there is illustrated a slightly modified arrangement of the structure wherein the platform 10a is provided with the deflector plates or louvers 30a that are constructed in exactly the same manner as those heretofore described with reference to the end frame 26 of the motor 15. The end frame 26a of the motor 15a is in this instance provided with conventional openings 25a. Thus a standard electric motor can be used in the modification of Figure 5 rather than requiring manufacture of a special end frame as is required in the form of the structure illustrated in Figures 2 and 4.

Figure 6:
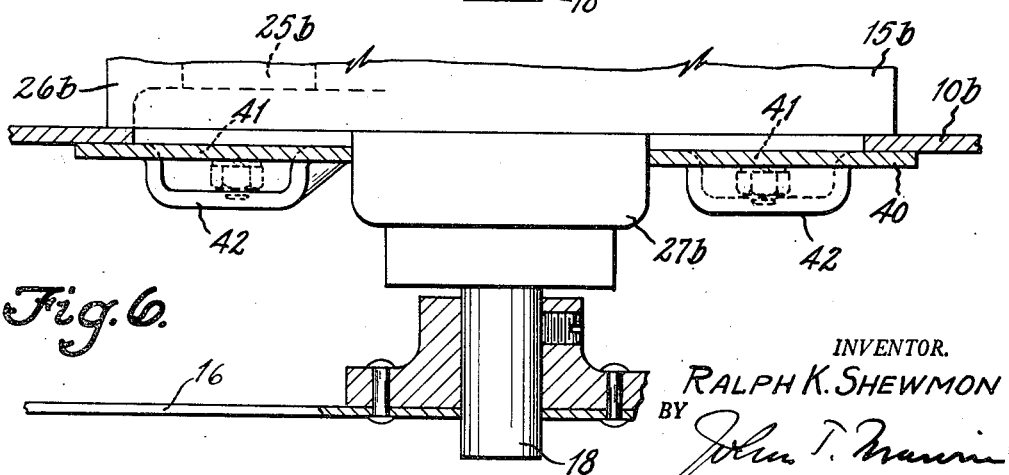
Figure 6 is a cross sectional view similar to Figures 4 and 5 but with the louvers or deflecting plates being positioned in a separate plate adapted for attachment to the mounting platform of the mowing machine.

In Figure 6 there is illustrated a still further modification of the structure of the apparatus wherein the motor 15b is mounted upon the platform 10b in the same manner as illustrated in Figures 2 and 4. In this instance however the openings 25b in the end frame 26b are again the standard openings provided in a motor of standard manufacture. In this instance there is provided a removable plate 40 secured to the underside of the platform 10b, the plate extending around the oil reservoir 27b of the electric motor.

The plate 40 is provided with a series of openings 41 positioned radially about the axis of the electric motor 15b, each of the openings 41 having a louver or deflector plate 42 positioned adjacent the same and substantially covering the opening 41 in exactly the same manner as illustrated in the structure shown in Figure 3.

While the form of embodiment of the invention as herein disclosed constitutes a preferred form, it is to be understood that other forms might be adopted as may come within the scope of the claims which follow.

What is claimed is as follows:

1. In a mowing apparatus, a platform supporting a power mechanism on one side thereof with the power mechanism including a drive shaft extending through the platform and having a mowing blade secured adjacent the opposite side of the platform on the end of the shaft and rotatable in a plane substantially parallel to said platform, said power mechanism also being constructed and arranged for circulation of air through the same with circulating air discharging from the power mechanism toward the platform, wall means substantially at the level of the platform having openings therein exposed at substantially the level of the platform to the space between the platform and the mowing blade through which said circulating air discharges into the said space, and other wall means forming open ended louver means covering the said openings at the platform level with the open end of the louver means facing reversely of the direction of rotation of said blade to provide for movement of air through the said openings and louver means in the direction of rotation of said blade and deflect mowed material from entrance into the openings.

2. In a mowing apparatus, a platform supporting an electric motor power device on one side of the platform with the drive shaft of the electric motor extending through the platform and having a mowing blade secured adjacent the opposite side of the platform on the end of the shaft and rotatable in a plane substantially parallel to said platform, said electric motor having wall means at each end, said wall means having openings therein to allow circulation of air through said motor, the openings in one end of the motor exposed at the level of the platform to the space between the platform and the mowing blade, and wall means forming open ended louver means covering each of the openings in the said one end of said motor at the platform level with the open end of the louver means facing reversely of the direction of rotation of said blade to provide for movement of air through the said openings in the said one end of said motor and said louver means and deflect mowed material from entrance into the said motor openings.

3. An apparatus in accordance with claim 2 with the wall means at one end of said motor being an end frame wherein the louver means is incorporated in the end frame of the electric motor.

4. An apparatus in accordance with claim 2 wherein the louver means is incorporated in the said platform and aligned with the openings in one end of the motor.

5. An apparatus in accordance with claim 2 wherein the louver means is incorporated in a plate secured to the platform adjacent one end of the motor with the openings in the motor substantially aligned with louver means in the plate.

6. A mowing apparatus in accordance with claim 2 in which the electric motor includes a fan internally thereof for forced circulation of air through the motor with the circulating air discharging through the said one end of the motor.

7. In a mowing apparatus, a platform supporting an electric motor power device on one side of the platform with the drive shaft of the electric motor extending through the platform and having a mowing blade secured adjacent the opposite side of the platform on the end of the shaft and rotatable in spaced relationship to said platform in a plane substantially parallel thereto, said electric motor having wall means at each end, said wall means having openings therein to allow circulation of air through said motor, the openings in one end of the motor exposed at the level of the platform to the space between the platform and the mowing blade, and deflector wall means at each of the openings at the platform level extending across the said openings and positioned angular to the said platform and disposed angularly in the direction of rotation of the said blade to provide for movement of air through the said openings and to deflect mowed material from entrance into the openings.

8. A mowing apparatus in accordance with claim 7 in which the electric motor includes a fan internally thereof for forced circulation of air through the motor with the circulating air discharging through the said one end of the motor.

References Cited in the file of this patent

UNITED STATES PATENTS

| 2,153,771 | Orr | Apr. 11, 1939 |
| 2,675,662 | Kroll | Apr. 20, 1954 |